United States Patent [19]

Benson

[11] Patent Number: 4,514,986
[45] Date of Patent: May 7, 1985

[54] DOUBLE-CHAMBERED EXHAUST MANIFOLD

[76] Inventor: Steven R. Benson, 1339 W. Main St., Vernal, Utah 84078

[21] Appl. No.: 514,631

[22] Filed: Jul. 18, 1983

[51] Int. Cl.³ .......................... F02B 37/00; F01N 7/10
[52] U.S. Cl. .......................................... 60/605; 60/323
[58] Field of Search ................. 60/323, 605, 598, 600, 60/601, 602, 603

[56] References Cited

U.S. PATENT DOCUMENTS

| | | | |
|---|---|---|---|
| 2,305,295 | 12/1942 | Lang | 60/605 |
| 3,068,638 | 12/1962 | Birmann | 60/605 |
| 3,673,798 | 7/1972 | Kuehl | 60/605 |
| 4,373,329 | 2/1983 | Martini | 60/323 |

FOREIGN PATENT DOCUMENTS 158334  2/1933  Switzerland ........................... 60/605

*Primary Examiner*—Douglas Hart
*Attorney, Agent, or Firm*—Mallinckrodt, Mallinckrodt, Russell & Osburn

[57] ABSTRACT

A double-chambered exhaust manifold with individual chambers that are connected edge to edge so as to independently pass exhaust gas flows through each. The first chamber is connected to receive an exhaust gas flow through exhaust ports of an internal combustion engine and connects to an inlet side of an exhaust driven turbine air compressor. The exhaust gas flow turns a turbine wheel that is connected to an impeller to compress the fresh air flow for passage to the engine air intake system. Exhaust from the turbine then passes to the second chamber that vents the exhaust gases into the vehicle exhaust system. The separate double-chambered exhaust manifolds are bent or otherwise contoured appropriately to fit within the space available within the vehicle engine compartment.

8 Claims, 5 Drawing Figures

DOUBLE-CHAMBERED EXHAUST MANIFOLD

BACKGROUND OF THE INVENTION

1. Field:

The invention relates to exhaust manifolds for all engines to drive and vent an exhaust gas driven turbine compressor.

2. State of the Art:

Heretofore, exhaust gas driven turbines for compressing inlet air flows to the intake manifold of a gasoline or diesel engine have involved separate exhaust tubes or lines. While earlier arrangements are satisfactory, such have crowded the available engine compartment space.

The present invention, by combining the separate lines or chambers into a single unit with a single mounting therefore minimizes the engine compartment space taken up, and greatly simplifies both the routing of exhaust gases from the turbine out of the engine compartment and its installation and removal over earlier separate systems. Where earlier systems have been particularly with V series engines, involving connecting the different lines at a number of points. The double-chambered manifold of the present invention mounts to one side of the engine exhaust ports only. It also provides, with standard coupling ends, for connection to a cross-over line, to combine exhausts from both sides of a V-engine, and for coupling that combined exhaust to the inlet and exhaust sides of a standard exhaust gas driven turbine compressor and to the vehicle exhaust system.

SUMMARY OF THE INVENTION

It is, therefore, a general object of the present invention to provide a double-chambered exhaust manifold for connection to the exhaust ports on a cylinder head of an internal combustion engine, that when arranged with a V-engine, can also be connected to receive the exhaust from the other engine side and is arranged for connection to both exhaust inlet and outlet side of an exhaust driven turbine air compression system and to the vehicle exhaust system.

Another object of the present invention is to provide a double-chambered exhaust manifold for installation to one side of an engine that takes up less room in the engine compartment than have conventional exhaust lines.

Another object of the present invention is to provide a double-chambered exhaust manifold that is easily and securely installed to one cylinder head of an engine.

Still another object of the present invention is to provide a double-chambered exhaust manifold that can be manufactured to fit within an available space or area remaining within a vehicle engine compartment after installation of an engine and associated components therein.

In accordance with the above objects, the present invention in a double-chambered exhaust manifold includes at least two separate chambers that are connected together across a line of exhaust ports, a first chamber receiving total exhaust flow from all ports and the second chamber independent from the first. With the invention arranged for use with a V-type engine, the first chamber, that receives exhaust from the one side of the engine, is connected to a cross-over line that connects to the other line of exhaust manifold ports in the opposite engine side. The two exhaust flows are thereby combined in that first chamber to pass through a flanged end that is for connection to an inlet side of a standard exhaust driven turbine air compressor. In the turbine, the engine exhaust flows into a drive cavity to turn a shaft mounted turbine wheel connected to turn an impeller journaled in a separate air compression cavity. The turning impeller compresses a fresh air flow received therein, for passage to the engine air intake system. The engine exhaust gases, after passage through the drive cavity of the exhaust driven turbine compressor travel into the second chamber that is connected to the vehicle exhaust system for venting that exhaust to atmosphere.

The manifold couples to the one side of the engine, the individual inlets thereof, aligning with and covering the engine cylinder head exhaust ports to provide a free exhaust passage therefrom. Preferably, the second chamber includes marmon type couplings on the chamber ends each having a ridge formed therearound proximate to its end for coupling in sealing engagement to a like marmon type coupling of a connecting line. The chamber and connecting line ends are joined and sealed together by installation of a collar therearound that fits over the ridges such that, when the collar is closed, the ridges will be drawn together moving the ends into sealing engagement. Thereby, the marmon type coupling ends are used to connect the second chamber ends to the ends of the turbine exhaust line and the vehicle exhaust system. The first chamber includes flanged ends, to couple to like flanged ends of a cross-over line, when such is appropriate as with a V-engine, and the turbine exhaust inlet line.

The double-chambered exhaust manifold provides for a simplified coupling arrangement for mounting it to the side of the engine so as to take up minimal space within that engine compartment, can be fabricated to fit within an available space and can be easily installed and removed using conventional tools.

THE DRAWINGS

The drawings illustrate that which is presently regarded as the best mode for carrying out the invention:

FIG. 1, shows in phantom lines a conventional V-engine that includes both a conventional exhaust gas driven turbine air compressor, and the double-chambered exhaust manifold of present invention that is shown mounted to one side of the engine and connects to the vehicle exhaust system and to a cross-over line secured to the opposite engine side to pass exhaust gas to and from the turbine compressor;

FIG. 1A, a view of the turbine air compressor removed from the engine and shows a section thereof, removed to expose drive and air compression cavities thereof;

FIG. 2, a front elevation view of the double-chambered exhaust manifold of FIG. 1 removed from the engine;

FIG. 3, a rear elevation view of the double-chambered exhaust manifold of FIG. 2; and FIG. 4, shows the double-chambered exhaust manifold of FIG. 3 with sections removed therefrom, exposing the internal configuration of each of the chambers, and showing with arrows the exhaust gas flows therethrough.

DETAILED DESCRIPTION

Figure 1:
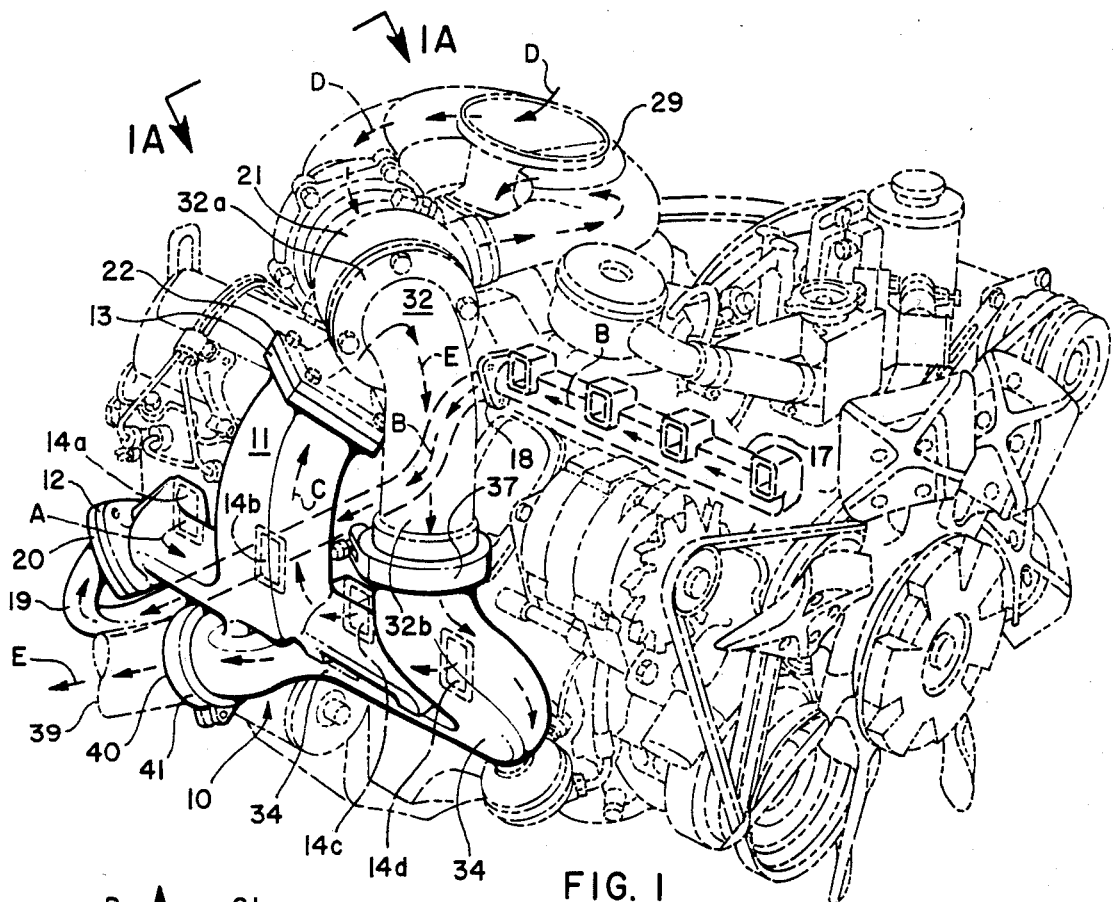

FIG. 1, shows in phantom lines, a V-8 engine that is shown for example and includes spaced apart exhaust ports arranged on each side wherethrough engine exhaust is vented. The present invention can be used with other engine arrangements additional to the V-engine, such as a straight block, by modifying the ports thereof and closing off one of the ends of a first or turbine exhaust inlet chamber within the scope of the following disclosure.

Figure 2:
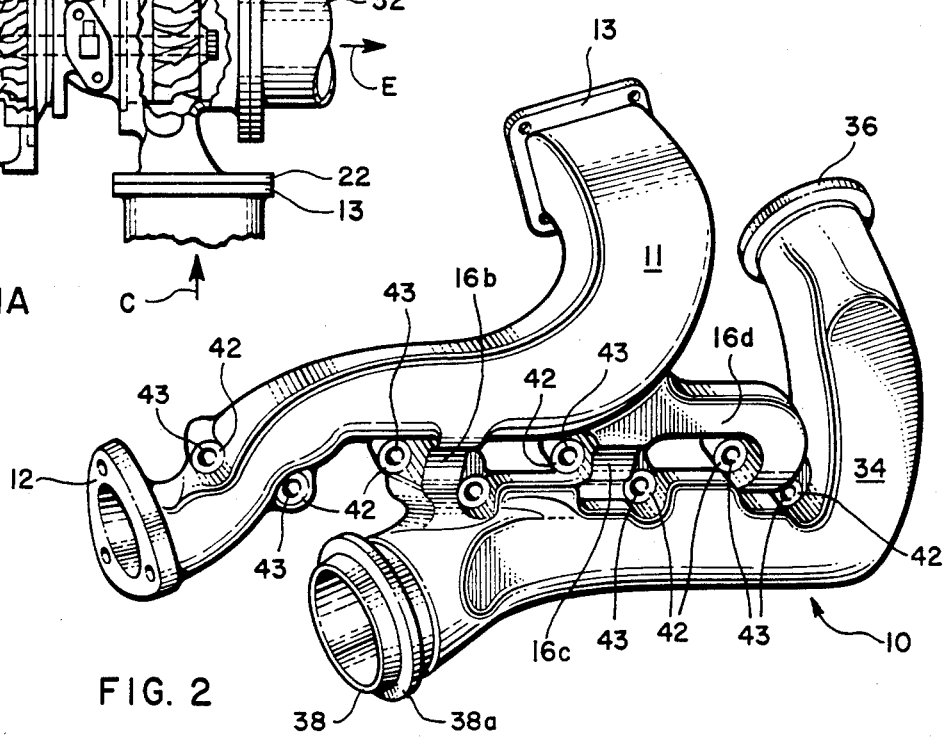
Figure 3:
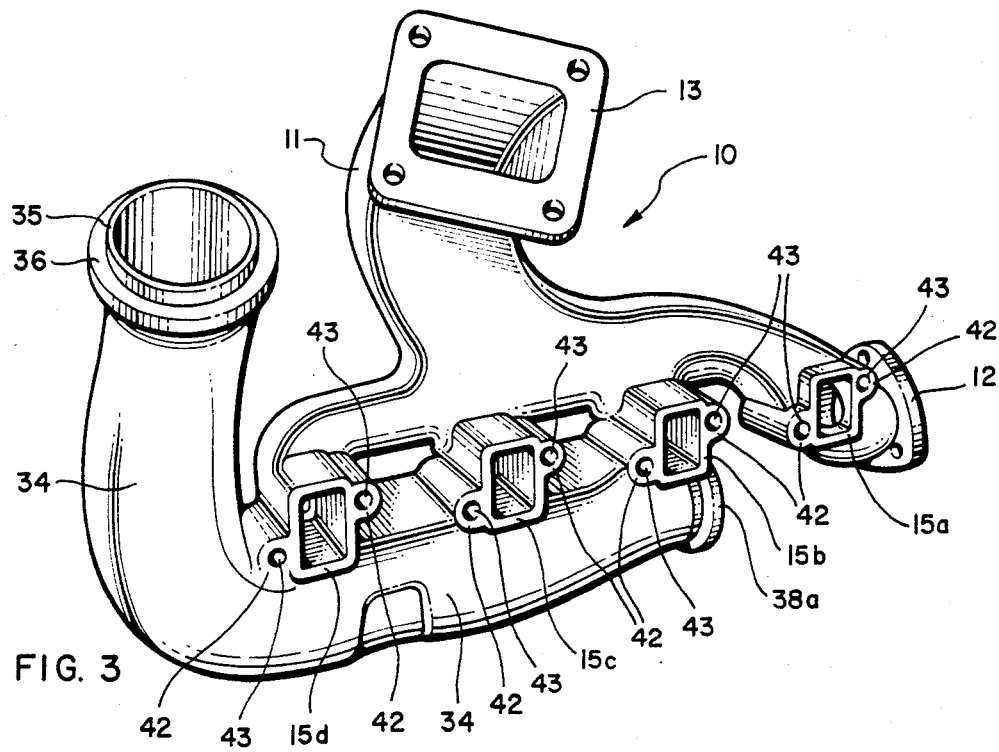

The present invention is in a double-chambered exhaust manifold 10 that is shown secured to the engine right side over the exhaust ports as viewed looking from the rear of the engine. The double-chambered exhaust system is herein after referred to as exhaust manifold 10, and includes a first or turbine exhaust inlet chamber 11 and a second or turbine exhaust outlet chamber 34. The chambers are independent of one another, are shaped by appropriate dog-leg bends and are curved to fit within the open area within an engine cavity. In the preferred embodiment, the exhaust manifold chambers are bent centrally into dog-legs to fit within the open area of an engine compartment with the V-8 engine shown in FIG. 1. The first chamber 11 includes on each end, respectively, a triangular shaped flanged end 12, and a square flanged end 13. Each flange has holes or openings formed therethrough, proximate to the flange corners wherethrough bolts or like connectors can be fitted. The first chamber is connected to the engine over exhaust ports 14a, 14b, 14c and 14d, that are shown in broken lines, wherethrough exhaust gases from the engine right side are vented. The first chamber, as shown in FIGS. 2 and 3, receives exhaust gases from these exhaust ports through inlets 15a, 15b, 15c and 15d that align with the engine exhaust ports. Inlet 15a is formed in the side of the first chamber 11 and the other inlets 15b, 15c and 15d, are ends, respectively, of spaced apart exhaust inlet tubes 16b, 16c and 16d that all open into the first chamber. So arranged, an engine exhaust gases flow travels through the exhaust ports, through the inlets and inlet tubes and into the first chamber.

As shown best in FIG. 1, exhaust from the opposite or left engine side, when the engine is viewed from the rear, is passed through engine exhaust ports like the exhaust ports 14a, 14b, 14c and 14d, and into an exhaust manifold 17, that is shown in broken lines. The exhaust manifold 17 includes spaced exhaust openings or ports for positioning over the exhaust ports on the left engines side. The exhaust manifold includes a flanged end 18, that connects to a like flanged end of a cross-over pipe 19 as by fitting bolts through aligned openings, with nuts turned on the bolt ends, not shown. The cross-over pipe is shown also in broken lines, and includes on its end opposite to its coupling to tube exhaust manifold 17, a triangular shaped flange 20. The triangular shaped flange 20 is arranged for alignment with the triangular shape flange 12 and includes holes or openings at the triangle corners for alignment with the holes of flange 12, for receiving bolts therethrough, with nuts thereover, not shown.

Figure 4:
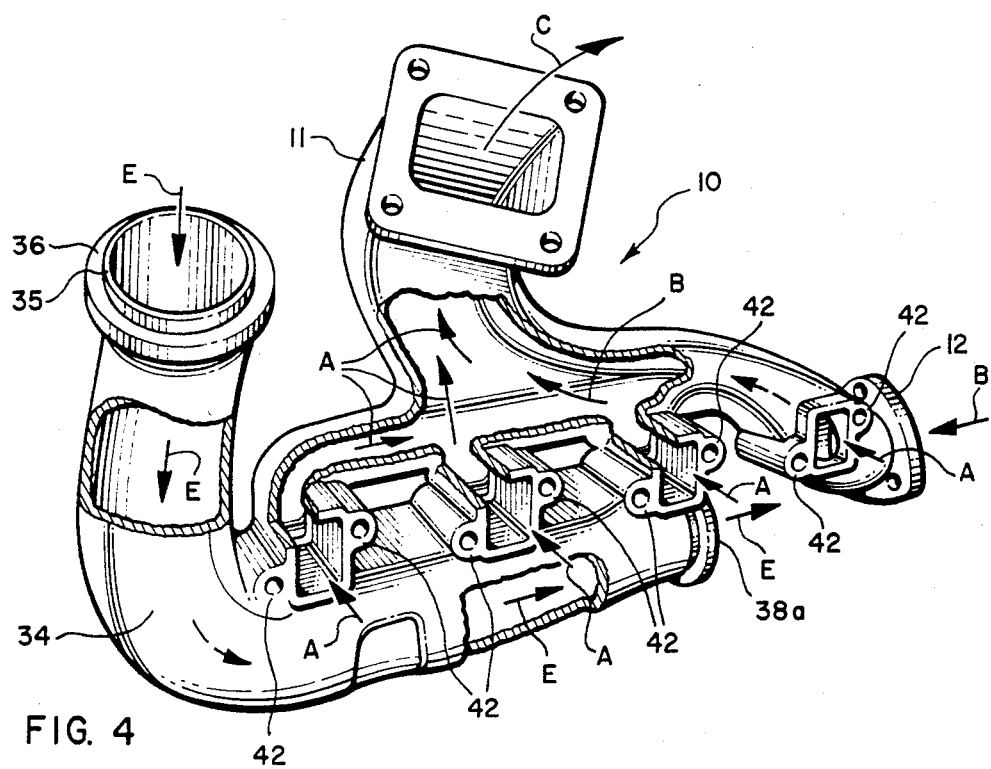

The V-engine exhaust gases that pass from the right side exhaust are illustrated as arrows A, with the exhaust from the left side identified as arrows B, as shown in FIGS. 1 and 4, and the combined exhaust gases exiting the first chamber 11 are shown as arrows C. Shown in FIG. 1, the combined exhaust gases, arrows C, travel into an exhaust inlet side of a turbine 21, FIG. 1A. The exhaust inlet side of turbine 21 includes a squared flanged end 22 for coupling to the square flanged end of 13 of the first chamber as by fitting bolts, or like fastens, through the aligned holes formed through the flanges, proximate to the corners of each, and turning nuts thereover, not shown.

Figure 1A:
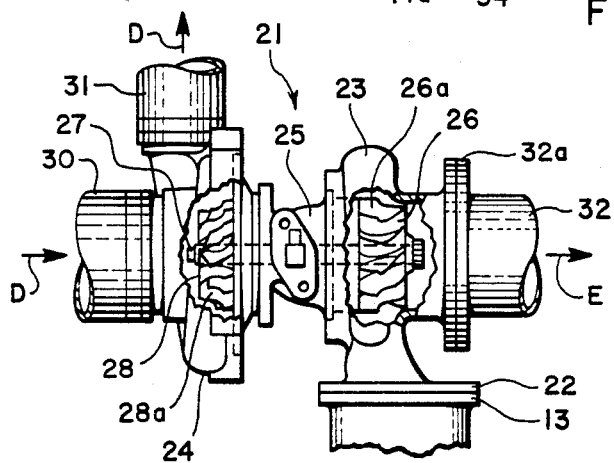

FIG. 1A shows the turbine 21 removed from the engine, with a top section thereof removed to expose a drive cavity 23 and an air compression cavity 24 that are separated by a bearing housing 25. The drive cavity is arranged to receive an engine exhaust gases flow from the first chamber 11, and to pass that exhaust therefrom through a turbine exhaust line 32. Within the drive cavity is arranged a turbine wheel 26 turned by that exhaust gas flow. The turbine wheel turns a shaft 27 that is journaled through the bearing 25 and has an impeller 28 secured thereto, in the compression chamber 24. Both the turbine wheel and impeller include blades 26a and 28a, respectively. The turbine wheel blades 26a are turned by the exhaust gas flow, the impeller blades 28a turn therewith to compress a fresh air flow. A plenum air source 29, as shown in FIG. 1, is connected to supply the inlet fresh air flow, shown as arrows D, that enters the air compression cavity 24 at inlet 30. The turning impeller blades 28a compress that air that is then exhausted through an exhaust 31 into the engine air intake manifold.

The air intake manifold can be part of a diesel engine where the compressed air is injected into the engine cylinders or can provide are to a carburetor system to mix with fuel for passage through a carburetor manifold and through the fuel valves into the engine.

The combined engine exhaust, after passage through the drive cavity 23 is vented, illustrated with arrows E in FIGS. 1 and 4, into and through an end 32a of a cylindrical turbine exhaust line 32. While a separate cylindrical turbine exhaust line is shown as exhaust line 32, it should be understood that such line could be formed as part of the second or turbine exhaust outlet chamber 34. The turbine exhaust line opposite end is a marmon type coupling end 32b for mating to a marmon type coupling end 35 of the second chamber 34. Each marmon type end includes an upstanding encircling ring proximate to the open end. The ring for end 35 is shown at 36 in FIGS. 2-4. In practice, the respective ends are drawn together in sealing engagement by installation of a collar 37 therearound and over the rings. The collar has sloping inner surfaces that contact the rings to draw them together when that clamp is closed appropriately.

The second chamber 34 is essentially like the first chamber 11 and is secured along an edge thereof, at spaced intervals to the exhaust inlet tubes 16b, 16c and 16d. So arranged, the exhaust gases from the turbine drive cavity 23 will travel through the second chamber 34, as illustrated by arrows E, and out from end 38 thereof, into the vehicle exhaust system for venting to atmosphere. The second chamber end 38, like its opposite end 35, is also a marmon type coupling end and includes, as shown in FIGS. 2-4, an upstanding encircling ring 38a proximate to the open end. An end 40 of an exhaust line 39 also includes a like upstanding encircling ring, not shown. To connect the ends 38 and 40 in sealing engagement a collar 41, is closed thereover. Collar 41, is like the described collar 37, and includes inwardly tapered interior sides that contact and draw the respective rings together, moving the ends 38 and 40 into sealing engagement.

FIGS. 2 and 3, are front and rear views of the exhaust system 10, and show the exhaust inlet ports 15a, 15b, 15c and 15d as each including a pair of lobes 42, one on each side of each port. Each lobe is shown to include a hole or opening 43 formed therethrough. The holes 43, when the exhaust system ports are aligned over the exhaust ports 14a, 14b, 14c and 14d, are arranged to line up with a like hole in the engine cylinder head that is threaded appropriately to receive a bolt, not shown, turned therein, to secure the exhaust manifold 10 to the engine.

FIG. 4, shows the exhaust manifold 10, with sections broken away from the respective first and second chambers 11 and 34 with arrows shown therein that represent the described engine exhaust gases flows, and show the chambers as providing independent exhaust gas flow paths.

Hereinabove, has been set out a description of the preferred embodiment of the double-chambered exhaust system 10 of the present invention and its arrangement and operation with a V-8 type engine. It should be understood that this arrangement can be used with any V-type engine having exhaust ports on both sides thereof, or with a straight block engine having exhaust ports on one side only and is therefore not limited to the arrangement shown in FIG. 1. While a preferred embodiment of the present invention in a double-chamber exhaust system has been shown and described herein as the best mode of carrying out the invention, in actual practice, variations and changes may be made thereto in adapting the invention to other engine configurations and to fit within space available within an engine compartment without departing from the subject matter coming within the scope of the following claims, which claims I regard as my invention.

I claim:

1. A double-chamber exhaust manifold for use with an exhaust gas driven turbine air compressor comprising, an exhaust inlet chamber including spaced apart inlet ports therein; means for connecting said exhaust inlet chamber over and to the exhaust ports of one cylinder head of an internal combustion engine, that is the sole means for mounting the double-chamber exhaust manifold to said internal combustion engine, such that exhaust ports of said cylinder head will align with to vent engine exhaust gases through said inlet ports; connection means for connecting said exhaust inlet chamber to the exhaust gas inlet side of an exhaust gas driven turbine air compressor; said separate exhaust outlet chamber rigidly connected to said exhaust inlet chamber; connection means for connecting said exhaust outlet chamber to the exhaust gas outlet side of said exhaust gas driven turbine air compressor; and means for coupling said exhaust outlet chamber to a vehicle exhaust system venting an exhaust gas flow thereto.

2. A double-chamber exhaust manifold as recited in claim 1, further including means for coupling said exhaust inlet chamber to a cross-over pipe end that extends from another engine exhaust manifold to pass exhaust gases therethrough to said first chamber;

3. A double-chamber exhaust manifold as recited in claim 1, wherein the exhaust inlet and exhaust outlet chambers are each similar bent to fit in the space available within a vehicle engine compartment with the internal combustion engine whereto it is connected.

4. A double-chamber exhaust manifold as recited in claim 3, wherein the first and second chambers are each formed to have similar dog leg bends therein.

5. A double-chamber exhaust manifold as recited in claim 1, wherein, as the means for connecting said exhaust chamber over and to the exhaust ports, the spaced apart inlet ports of the exhaust inlet chamber each include a pair of lobes, one lobe on opposite sides thereof, each having a hole formed therethrough for alignment with like holes in said engine cylinder head adjacent to said exhaust ports that are each arranged for receiving a fastening device installed therethrough and turned into said aligned engine cylinder head exhaust ports hole.

6. A double-chamber exhaust manifold as recited in claim 1, wherein the connection means for coupling the exhaust inlet chamber to the exhaust gas inlet side of the exhaust gas driven turbine air compressor is a flange end arranged to fit against a like flange end that extends from said exhaust gas inlet and which flanges each include holes that will align to receive fasteners fitted therethrough, to connect in sealing engagement said flange ends together.

7. A double-chamber exhaust manifold as recited in claim 1, wherein the connection means for connecting the exhaust outlet chamber to the exhaust gas outlet side of said exhaust gas driven turbine air compressor is a cylindrical turbine exhaust line that includes a means on one end thereof for coupling to the exhaust outlet of said exhaust gas driven turbine air compressor and includes a coupling arranged on the opposite end.

8. A double-chamber exhaust manifold as recited in claim 7, wherein the exhaust outlet chamber includes marmon type couplings on each end thereof for alignment with, respectively, like coupling ends of the cylindrical turbine exhaust line and an end of the vehicle exhaust system; and individual collar means for encircling each of the aligned marmon type end couplings, fitting over encircling rings thereof for drawing said rings together moving the, respective, aligned ends into sealing engagement when each said collar means is closed.

* * * * *